United States Patent
Engstrom

(10) Patent No.: US 7,065,387 B2
(45) Date of Patent: Jun. 20, 2006

(54) MOBILE DIGITAL COMMUNICATION/COMPUTING DEVICE HAVING VARIABLE AND SOFT LANDING SCROLLING

(75) Inventor: G. Eric Engstrom, Kirkland, WA (US)

(73) Assignee: Wildseed Limited, Kirkland, WA (US)

( * ) Notice: Subject to any disclaimer, the term of this patent is extended or adjusted under 35 U.S.C. 154(b) by 235 days.

(21) Appl. No.: 10/686,341

(22) Filed: Oct. 14, 2003

(65) Prior Publication Data

US 2004/0077381 A1 Apr. 22, 2004

Related U.S. Application Data

(60) Provisional application No. 60/418,766, filed on Oct. 15, 2002.

(51) Int. Cl.
*H04M 1/00* (2006.01)
(52) U.S. Cl. .................. 455/566; 455/550.1; 345/169; 345/156

(58) Field of Classification Search ................ 455/566; 345/156, 169
See application file for complete search history.

(56) References Cited

U.S. PATENT DOCUMENTS

| 6,198,473 B1 * | 3/2001 | Armstrong .................. 345/163 |
| 6,539,243 B1 * | 3/2003 | Kimura et al. ........... 455/550.1 |
| 2002/0158812 A1 * | 10/2002 | Pallakoff ........................ 345/5 |

* cited by examiner

*Primary Examiner*—George Eng
*Assistant Examiner*—Julie E. Stein
(74) *Attorney, Agent, or Firm*—Schwabe, Williamson & Wyatt, P.C.

(57) ABSTRACT

In accordance with one embodiment, a mobile communication device is provided with scrolling logic to scroll information displayed on a display at variable scroll rate. In accordance with another embodiment, a mobile communication device is provided with scrolling logic to stop scrolling gradually.

14 Claims, 6 Drawing Sheets

100

MOBILE DIGITAL COMMUNICATION/COMPUTING DEVICE HAVING VARIABLE AND SOFT LANDING SCROLLING

RELATED APPLICATIONS

This non-provisional patent application claims priority to U.S. provisional patent application No. 60/418,766, entitled "A MOBILE DIGITAL COMMUNICATION/COMPUTING DEVICE HAVING A VARIABLE AND SOFT LANDING SCROLLING", filed on Oct. 15, 2002 and having common inventorship with the present application, which is hereby fully incorporated by reference.

FIELD OF INVENTION

The present invention relates to the fields of mobile communication and/or computing devices. More specifically, the present invention relates to scrolling on these devices.

BACKGROUND OF THE INVENTION

Advances in computer and telecommunication technology have led to wide spread adoption of mobile client devices, from the basic wireless telephones to function rich notebook sized personal computers (PCs) that pack the power of a desktop computer. In between are web enabled wireless mobile phones, palm sized personal digital assistants (PDA) and so forth. Even the wireless mobile phones and PDAs are becoming more powerful and versatile to the extent that wireless mobile phones may also incorporate many of the features originally provided for in handheld electronic devices, such as the PDAs. For example, PDA features such as keeping a list of contacts, a calendar, appointments, and the like have been generally integrated into recent wireless mobile phones. Moreover, some wireless mobile phones enable the browsing of web pages on the Internet or other on-line services. As a result, information available from these mobile devices has greatly increased.

However, unlike PCs, wireless mobile phones or wireless mobile devices are inherently limited in their input capability. Often times, complex operations have to be accomplished or navigated using a standard 12-key input keypad. In order to provide some assistance to the standard 12-key input keypad, commonly, an input key may be provided, such as a scroll button. For example, the scroll button may be utilized to scroll up or down through a listing of information, such as names, calendars, appointments, web pages, etc.

However, under the prior art scrolling method, scrolling up or down through the information can be time consuming because the rate at which the scrolling occurs can be slow frustrating for a user. For example, constantly pressing the scroll button scrolls the information at a single rate, thereby frustrating the user that desires the information quickly. Pressing the button repeatedly in rapid succession can cause over shooting of the desired information because as the user presses the scroll button repeatedly in rapid succession, the user may have the tendency to reflexively press the scroll button repeatedly, thereby, overshooting/undershooting the desired information.

Thus, typical prior art navigation approaches, such as, scrolling through information, are relatively cumbersome, frustrating, time consuming, and especially undesirable for input facilities limited wireless mobile devices, such as wireless mobile phones.

Accordingly, a need exists for a more efficient and friendly manner of scrolling through information.

BRIEF DESCRIPTION OF DRAWINGS

The present invention will be described by way of exemplary embodiments, but not limitations, illustrated in the accompanying drawings in which like references denote similar elements, and in which.

DETAILED DESCRIPTION OF EMBODIMENTS OF THE INVENTION

Embodiments of the present invention include a novel approach to scrolling through information, having particular application to wireless mobile devices, such as wireless mobile phones. This and other advantages will be evident from the disclosure.

Parts of the description will be presented in terms, such as mobile devices, information, listings, and so forth, consistent with the manner commonly employed by those skilled in the art to convey the substance of their work to others skilled in the art. As well understood by those skilled in the art, the terms "mobile devices" as used herein, comprise wireless mobile phones, PDA, and other devices of the like.

In the following description, various aspects of the present invention will be described. However, it will be apparent to those skilled in the art the present invention may be practiced with only some or all aspects of the present invention. For purposes of explanation, specific numbers, materials, and configurations are set forth in order to provide a thorough understanding of the present invention. However, it will also be apparent to one skilled in the art that the present invention may be practiced without the specific details. In other instances, well known features are omitted or simplified in order not to obscure the present invention.

Various operations will be described in turn in a manner that is most helpful in understanding the present invention, however, the order of description should not be construed as to imply that these operations are necessarily order dependent. Furthermore, the phrase "in one embodiment" will be used repeatedly, however the phrase does not necessarily refer to the same embodiment, although it may. The terms "comprising", "having", "including" are synonymous, unless the context requires otherwise.

Figure 1:
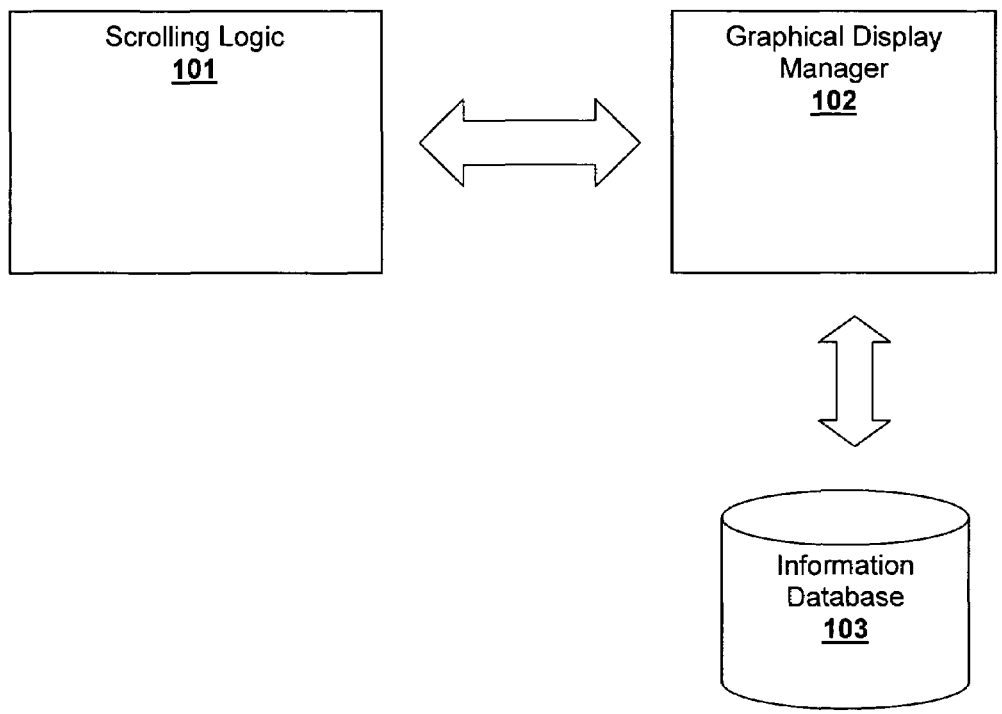
FIG. 1 illustrates an overview of the present invention in block diagram form of a mobile device incorporating the present invention, in accordance with one embodiment.

FIG. 1 illustrates an overview of the present invention in block diagram form of a mobile device incorporating the present invention, in accordance with one embodiment. Illustrated in FIG. 1 is a mobile client device 100 having scrolling logic 101 communicatively coupled to a graphical display manager 102. Additionally, information database 103 is shown communicatively coupled to the graphical display manager. As will be described in further detail below, together, the scrolling logic 101, graphical display manager 102, and information database 103 cooperate to facilitate variable scrolling, thereby increasing speed and efficiency of accessing the information stored in the information database 103.

In various embodiments, variable scrolling is facilitated by changing a scroll rate based at least in part on an amount of time of activation of a scroll button.

In various embodiments, variable scrolling is facilitated by changing a scroll rate based at least in part on a pressure applied to the activation of a scroll button.

Further, in various embodiments, a soft landing of scrolling is facilitated by starting at variable scrolling rates and incrementally decreasing the scrolling rate.

Figure 2:
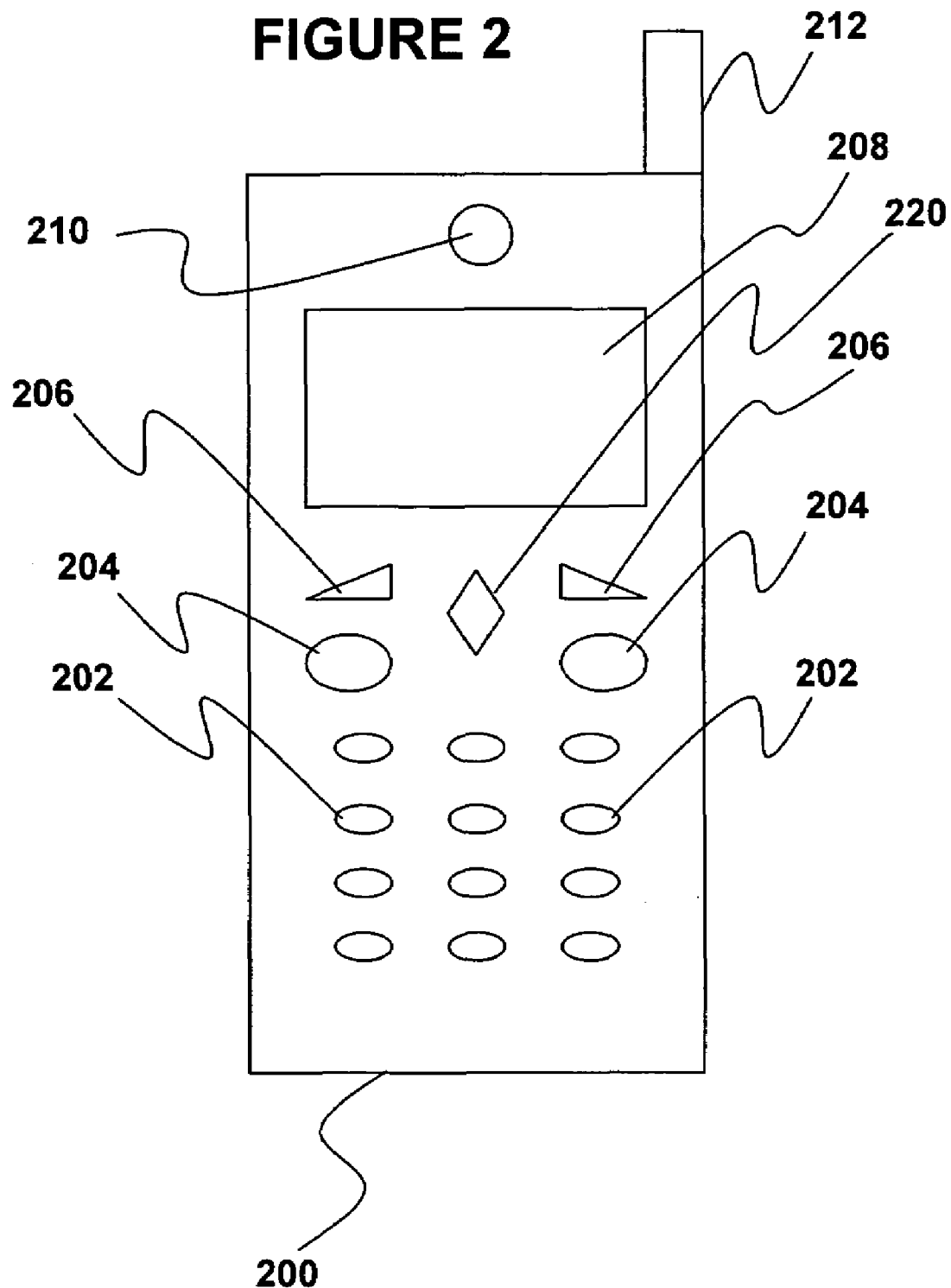
FIG. 2 illustrates an overview of the present invention, in the context of an exemplary mobile device such as a wireless mobile phone, in accordance with one embodiment.

FIG. 2 illustrates an overview of the present invention, in the context of an exemplary mobile device such as a wireless mobile phone, in accordance with one embodiment. Exemplary wireless mobile phone 200 illustrated in FIG. 2, similar to conventional wireless mobile phones, includes key pad 202, "talk" and "end talk" buttons 204, cursor control buttons 206, display screen 208, speaker 210, and antenna 212. Additionally, wireless mobile phone 200 includes a scroll button 220. However, unlike prior art wireless mobile phones, wireless mobile phone 200 is provided with scroll logic 101 (shown in FIG. 1) to facilitate variable scrolling and soft landing capabilities, in accordance the various embodiments of the present invention.

Accordingly, under the present invention, a user may quickly and efficiently scroll through information in a mobile device. More particularly, a user may scroll through information at variable scrolling rates including stopping with a soft landing.

Before proceeding to further describe the present invention, it should be noted while for ease of explanation, the remaining descriptions are presented primarily in the context mobile devices, however, based on the description to follow, a person skilled in the art will appreciate that the present invention may be adapted for other applications besides mobile devices. Additionally, for ease of understanding, information is presented in terms of listings. However, based on the description to follow, it should be appreciated that information may be in any number of forms, e.g., web pages (i.e., web enabled functionality that may be found in some mobile devices). Application of the present invention for other forms information is well within the ability of those skilled in the art, accordingly, the present invention will not be redundantly re-described for all the various information available on the mobile devices.

Figure 3:
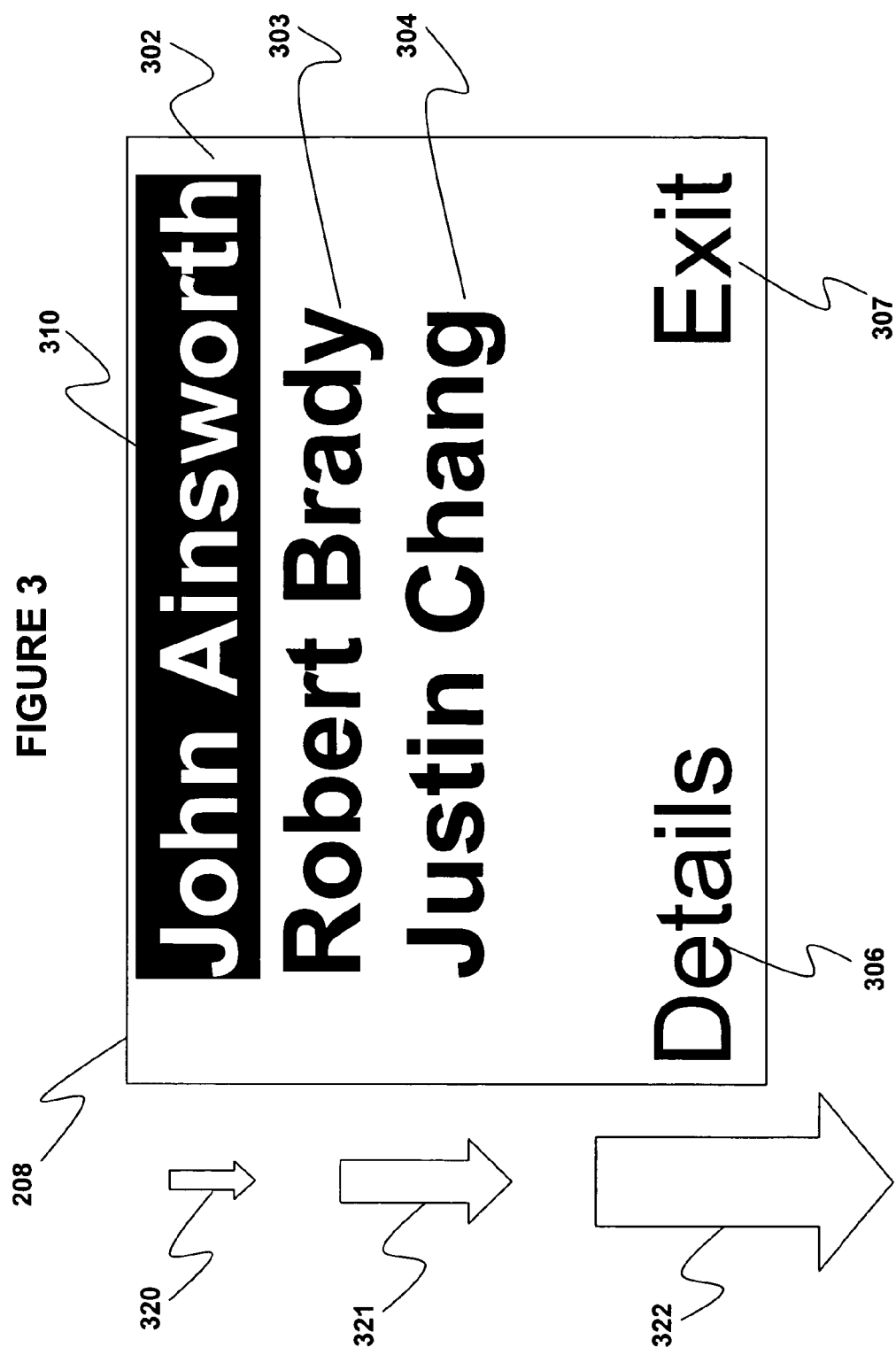
FIG. 3 illustrates a first aspect of the invention, in particular, variable scrolling of information, in accordance with one embodiment of the present invention.

FIG. 3 illustrates a first aspect of the invention, in particular, variable scrolling of information, in accordance with one embodiment of the present invention. Illustrated in FIG. 3 is the display 208 of wireless mobile phone 200 (shown in FIG. 2) in further detail. Display 208 is shown displaying information 302–304, such as in the form of a listing of names. Additionally, displayed on display 208 are two cursor function indicators 306–307. As will be described below, quick and efficient scrolling through the information 302–304 is facilitated, in accordance with the teachings of the invention.

A first information 302 is shown having highlighting 310 to indicate that the first information 302 is currently selectable. That is, if cursor control button 206 (shown in FIG. 2) located substantially below one of the cursor control function indicators 306–307 is selected, a new display will occur based at least in part on the selected cursor control function indicator. For example, in the illustrated embodiment, if cursor control button 206 is selected substantially located below the cursor function indicator 306, details regarding the first information 302 will be displayed.

Once the scroll button 220 (shown in FIG. 2) is selected, the highlighting 310 will move in a direction based at least in part on the direction of the scroll button 220 selection. In the illustrated embodiment of FIG. 3, it is assumed that the scroll button 220 is selected to scroll down the information 302–304. That is the highlighting 310 will move to the second information 303, and then to the third information 304, and so on. Shown in FIG. 3, as the scroll button 220 is held down for a predetermined amount of time, the scrolling rate progressively increases, in accordance with one embodiment. Accordingly, progressively larger arrows 320–322 (starting from smaller 320 to larger 322) indicate that the scrolling rate progressively increases.

As a result, in one embodiment, variable scrolling rate of information is advantageously facilitated based at least in part on a length of time activation of a scroll button in a wireless mobile phone. Accordingly, increased speed and efficiency is facilitated.

The predetermined time and rate may be application dependent, and preferably user configurable. For example, for each second the scroll button 220 is held down, the scrolling rate may increase by a factor of 1 (i.e., 1 second may result in scrolling of 1 listing at a time, 2 seconds may result in scrolling of 2 listings at a time, 3 seconds may result in scrolling of 3 listings at a time, and so forth).

Shown in FIG. 3, the scrolling is visually indicated by the movement of the highlighting 310, however, as alluded to previously, the scrolling may be in the form paging up or down of a web page for web enabled mobile devices, such as web enabled wireless mobile phones.

Figure 6:
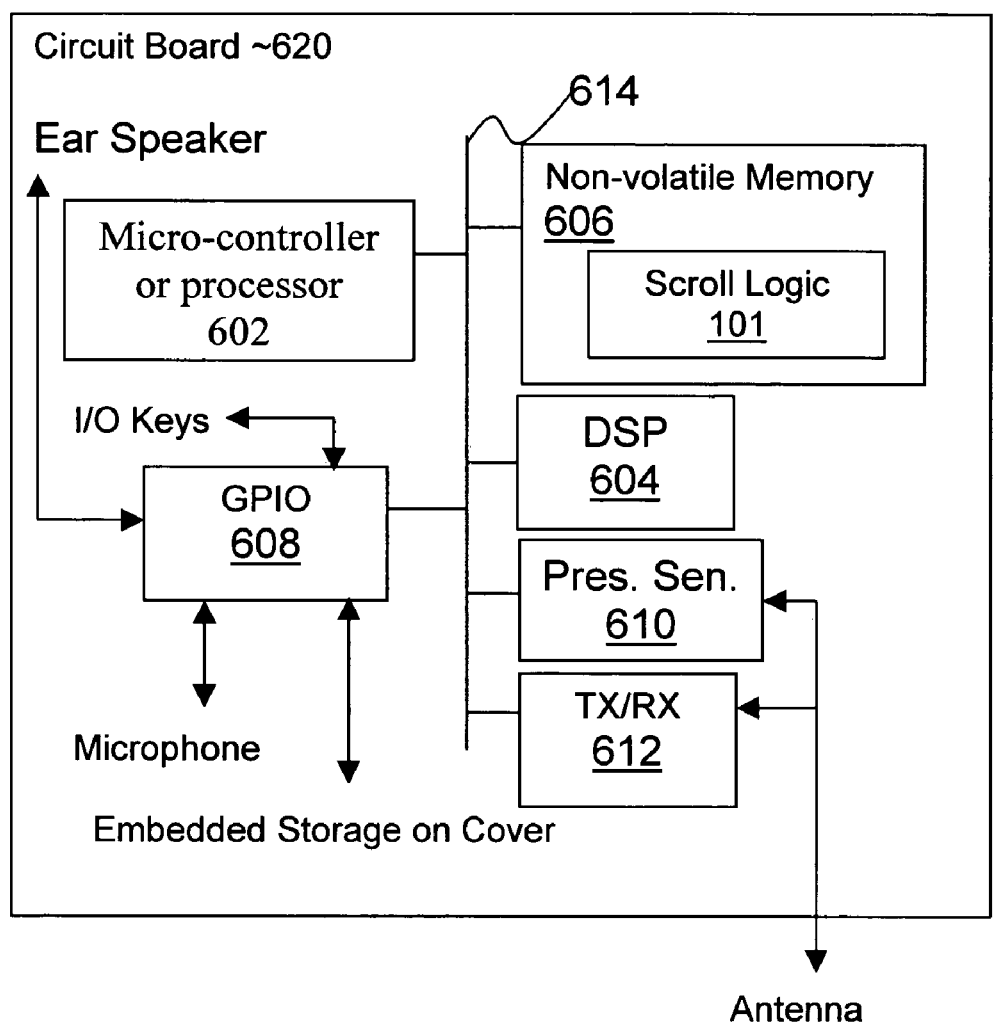
FIG. 6 illustrates a mobile device 100 incorporated with the teachings of the present invention in further details, in accordance with one embodiment.

In an alternate embodiment, the scroll button 220 may be equipped with a pressure sensing mechanism 610 (shown in FIG. 6). Accordingly, the scroll rate may increase based at least in part on a pressure applied to the scroll button 220. That is, the scroll rate may increase incrementally as increasing force is applied to the scroll button 220. For example, a force of 1 pound may result in scrolling rate of 1 listing at a time, a force of 2 pounds may result in a scrolling rate of 2 listings at a time, a force of 3 pounds may result in a scrolling rate of 3 listings at a time, and so forth.

As a result, in one embodiment, variable scrolling rate of information is advantageously facilitated based at least in part on a pressure applied to a scroll button in a wireless mobile phone.

Figure 4:
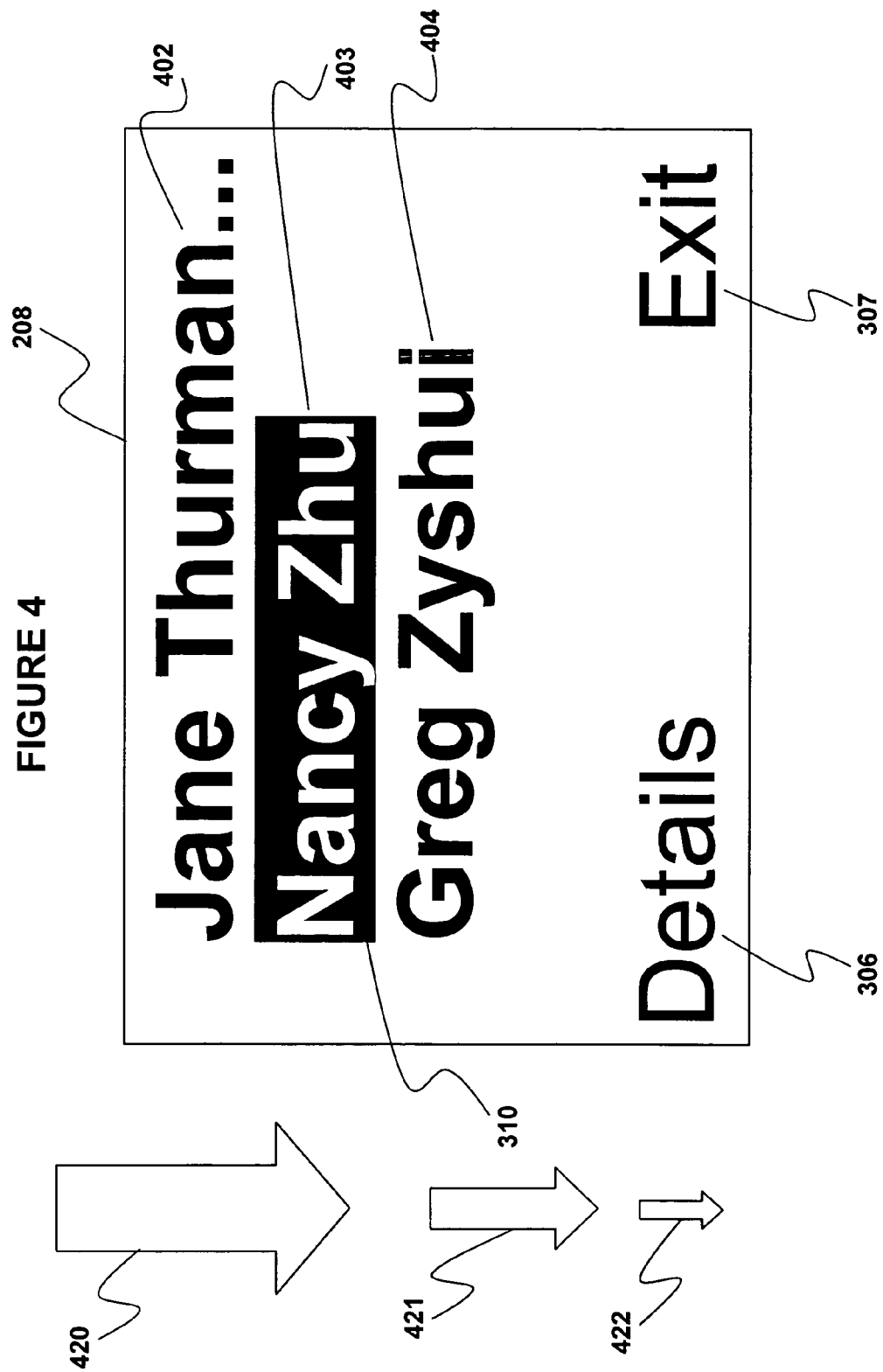
FIG. 4 illustrates a second aspect of the invention, in particular, soft landing of scrolling, in accordance with one embodiment of the present invention.

FIG. 4 illustrates a second aspect of the invention, in particular, soft landing of scrolling, in accordance with one embodiment of the present invention. Illustrated in FIG. 4 is the display 208 of wireless mobile phone 200 (shown in FIG. 2) in further detail. Display 208 is shown displaying information 402–403, such as in the form of a listing of names. Additionally, displayed on display 208 are two cursor function indicators 306–307. As will be described below, soft landing of scrolling of information 402–404 is facilitated, in accordance with the teachings of the invention.

In FIG. 4, highlighting 310 is shown as having landed on a second information 403. In the embodiment illustrated, the scrolling landed on the second information 403 by a progressively decreasing scroll rate. Accordingly, directional arrows 420–422 progressively decrease in size illustrating a slowing of the scroll rate. That is, a large arrow 420 indicates a fast scroll rate while a smaller arrow 422 indicates a slow scroll rate as compared to the larger arrow 420.

For example, the scroll button 220 may be utilized to facilitate variable scrolling, where the scroll rate is increased to a fast scroll rate, as previously described. Subsequently, the scroll button 220 may be released, whereby the fast scroll rate decreases incrementally to a stop resulting in a soft landing of the scroll.

As a result, a user may advantageously browse scrolling information as the scroll rate slowly comes to a stop (i.e., a soft landing).

Briefly referring back to FIG. 3, in various alternate embodiments, the scroll button 220 may be held for a predetermined period of time and then released resulting in a soft landing starting from the released scroll rate. For example, the scroll button 220 may be released at 2 seconds (i.e., 2 listings at a time), and the soft landing occurs from 2 listing at a time to stop. Accordingly, the scroll button 220 may be released at a force of 2 pounds (i.e., 2 listings at a time), and the soft landing occurs from 2 listings at a time to stop.

In various alternate embodiments, the scroll rate may not stop at all. Again briefly referring back to FIG. 3, the scroll button may 220 may be released at 2 seconds (i.e., 2 listings at a time), and the scroll rate continues at the released rate of 2 listings at a time. Accordingly, the scroll button 220 may be released at a force of 2 pounds (i.e., 2 listings at a time), and the scroll rate continues at the released rate of 2 listings at a time.

In further various embodiments, activating the scroll button 220 in the opposite direction of current scroll may facilitate variable directional change. For example, as previously described, as the scrolling is facilitated in a downward direction, the scroll button 220 may be released and activated to scroll upwards. The scrolling may slow incrementally to a stop, and then proceed to scroll upwards variably in the manner as previously described (i.e., time/pressure).

It should be appreciated that in FIGS. 3–4, scrolling was shown in the downward direction, however, it should be appreciated that the scrolling may occur in any direction of scrolling, such as, but not limited to, upwards.

Figure 5:
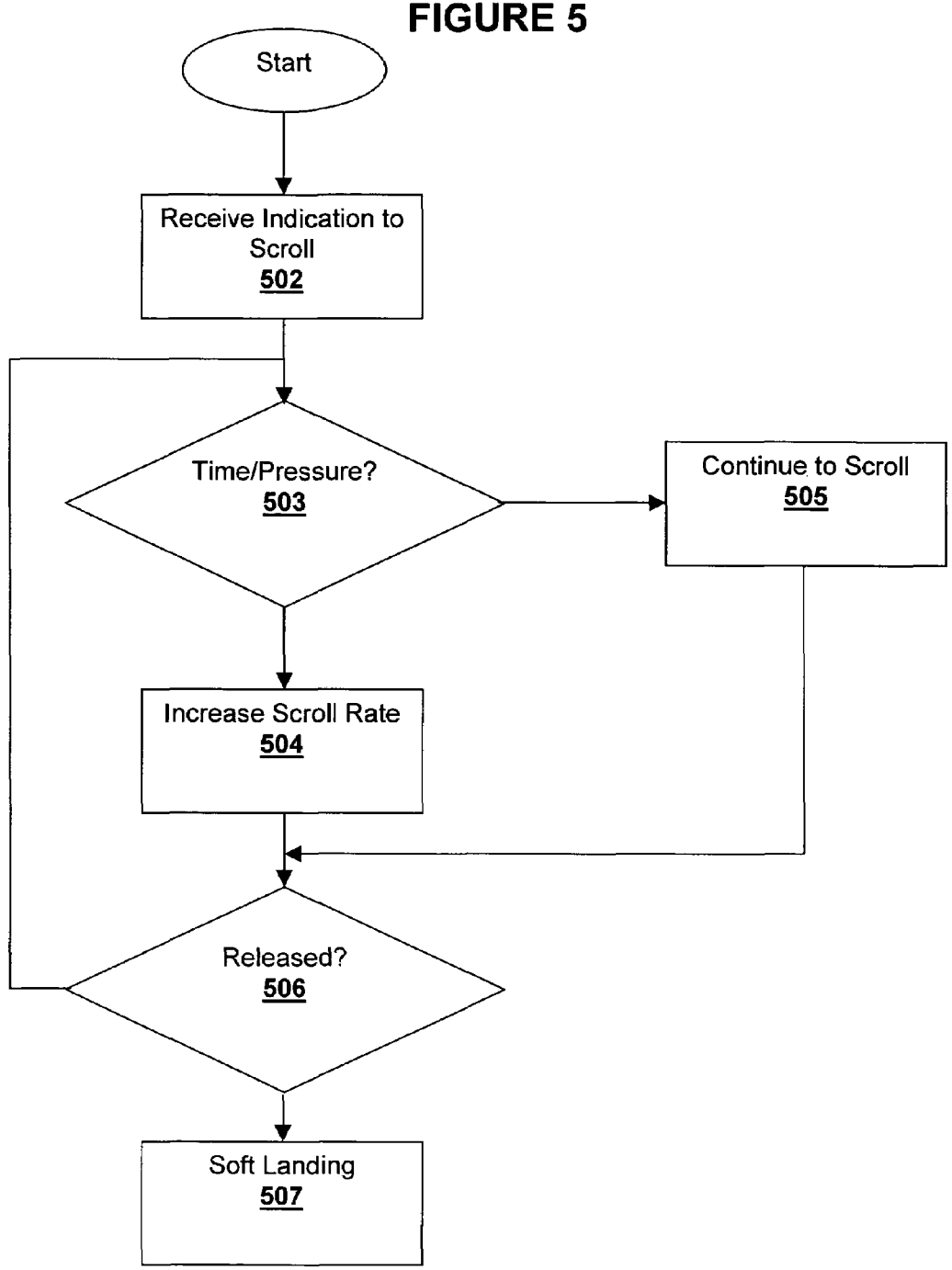
FIG. 5 illustrates the operational flow of the relevant aspects of scroll logic 101 (shown in FIG. 1), in accordance with one embodiment of the present invention.

FIG. 5 illustrates the operational flow of the relevant aspects of scroll logic 101 (shown in FIG. 1), in accordance with one embodiment of the present invention. It will appreciated by those skilled in the art that based at least in part on the description, in practice, scroll logic 101 may be implemented in hardware, e.g., through ASIC, or in software, executed e.g., by an embedded controller.

On initialization, scroll logic 101 receives an indication of scrolling of information, block 502. As previously described, the activation may be a scroll button 220, and the direction of the scroll may vary based at least upon the direction of activation of the scroll button.

At block 503, it is determined if the scroll button is activated for a predetermined amount of time. As previously described, the determination at block 503 may also be a determination of whether an increase in pressure is received.

If it is determined that the scroll button is activated for a predetermined amount of time, the scroll logic 101 causes the scroll rate on the display to increase, block 504. Additionally, if it is determined that an increase in pressure is received, the scroll rate is increased. As previously described, the increase in the scroll rate may be based at least in part on the amount of time and/or pressure.

However, if it is determined that the scroll button was not activated for a predetermined amount of time, the scroll logic 101 causes the scroll rate to maintain at the rate based at least in part on the amount of time and/or pressure, block 505.

At block 506, it is determined if the scroll button has been deactivated. If it is determined that the scroll button is released, a soft landing of the scrolling is facilitated, block 507. As described above, in various embodiments, upon receiving an indication of release of the scroll button, the scroll logic 101 may cause the scroll rate to continue, stop, reverse, and so forth.

FIG. 6 illustrates a mobile device 100 incorporated with the teachings of the present invention in further details, in accordance with one embodiment. As alluded to earlier, for the illustrated embodiment, mobile device 100 is a wireless mobile phone; however, for other embodiments, mobile device 100 may be other mobile devices, including but are not limited to PDA.

As illustrated in FIG. 6, core unit of mobile device 100 includes conventional elements, such as micro-controller/processor 602, digital signal processor (DSP) 604, non-volatile memory 606, general purpose input/output (GPIO) interface 608, pressure sensor 610, and transmit/receive (TX/RX) 612 (also known as a transceiver), coupled to each other via bus 614, and disposed on a circuit board 620.

The core unit of mobile device 100 is endowed with a software implementation of scroll logic 101 in support of the earlier described approach to variable scrolling and soft landing capabilities.

Except for scroll logic 101 and the pressure sensing mechanism 610 provided to mobile device 100, each of these elements 602–608 and 612–614 performs its conventional function known in the art, and is intended to represent a broad range of such element and its equivalents. In particular, TX/RX 612 may be designed to support one or more of any of the known signaling protocols, including but are not limited to CDMA, TDMA, GSM, and so forth. Moreover TX/RX 612 may be implemented using separate transmitter and receiver.

Accordingly, elements 602–608 and 612–614 will not be further described.

What is claimed is:

1. A mobile communication device comprising:
   a transceiver to facilitate transmission and receipt of audio communication;
   a display to display information;
   a scroll button; and
   scrolling logic coupled to the scroll button and the display, to scroll information displayed on the display at a variable scroll rate responsive to at least a selected one of an amount of time the scroll button has been pressed, and an amount of pressure applied to the scroll button, and to stop scrolling information displayed on the display in response to ceasing of said pressing of the scroll button, the scrolling logic adapted to intentionally cause the scrolling of information displayed on the display to gradually slow down prior to coming to a complete stop.

2. The mobile communication device of claim 1, wherein the scrolling logic is designed to scroll information displayed on the display at an increasing scroll rate responsive to the amount of time the scroll button has been pressed.

3. The mobile communication device of claim 1, wherein the scrolling logic is designed to scroll information displayed on the display at an increasing scroll rate responsive to the amount of pressure applied to the scroll button.

4. The mobile communication device of claim 3, wherein the mobile communication device further comprises a pressure sensor to sense the amount of pressure being applied to the scroll button.

5. The mobile communication device of claim 1, wherein the mobile communication device comprises a wireless mobile phone.

6. A mobile communication device comprising:
a transceiver to facilitate transmission and receipt of audio communication;
a display to display information;
a scroll button; and
scrolling logic coupled to the scroll button and the display, to scroll the information displayed on the display in response to a selection of the scroll button, and to stop said scrolling of information displayed on the display in response to a de-selection of the scroll button, the scrolling logic adapted to intentionally cause the scrolling of information displayed on the display to gradually slow down prior to coming to a complete stop.

7. The mobile communication device of claim 6, wherein the mobile communication device comprises a wireless mobile phone.

8. In a mobile communication device, a method of operation comprising:
receiving an indication of a scroll button of the mobile communication device being pressed;
scrolling information displayed on a display of the mobile communication device at a variable scroll rate, responsive to a selected one of an amount of time the scroll button has been pressed and an amount of pressure applied to the scroll button; and
stopping scrolling of information displayed on the display in response to ceasing of said pressing of the scroll button, including intentionally causing a gradual slow down of the scrolling of information displayed on the display prior to a complete stop.

9. The method of claim 8, wherein said scrolling of information at a variable rate comprises scrolling information displayed on the display at an increasing scroll rate responsive to the amount of time the scroll button has been pressed.

10. The method of claim 8, wherein said scrolling of information at a variable rate comprises scrolling information displayed on the display at an increasing scroll rate responsive to the amount of pressure applied to the scroll button.

11. The method of claim 10, wherein the method further comprises sensing the amount of pressure applied to the scroll button.

12. The method of claim 8, wherein the mobile communication device comprises a wireless mobile phone.

13. In a mobile communication device, a method of operation comprising:
receiving an indication of ceasing of pressing of a scroll button of the mobile communication device; and
in response, stopping scrolling of information displayed on a display of the mobile communication device, including intentionally causing a gradual slow down of the scrolling of information displayed on the display prior to a complete stop.

14. The method of claim 13, wherein the mobile communication device comprises a wireless mobile phone.

* * * * *

UNITED STATES PATENT AND TRADEMARK OFFICE
CERTIFICATE OF CORRECTION

PATENT NO. : 7,065,387 B2
APPLICATION NO. : 10/686341
DATED : June 20, 2006
INVENTOR(S) : G. Eric Engstrom It is certified that error appears in the above-identified patent and that said Letters Patent is hereby corrected as shown below:

Column 1
Line 53, "...can be slow frustrating..." should read --...can be slow and frustrating...--.

Column 2
Line 26, "... in further details..." should read --... in further detail...--.

Column 3
Line 31, "...in accordance the various..." should read --...in accordance with the various...--.

Column 5
Line 24, "...scroll button may 202 may..." should read --...scroll button 202 may...--.

Column 6
Line 12, "...in further details..." should read --...in further detail...--.

Signed and Sealed this

Tenth Day of April, 2007

JON W. DUDAS
*Director of the United States Patent and Trademark Office*